United States Patent

Bear et al.

[11] Patent Number: 5,664,847
[45] Date of Patent: Sep. 9, 1997

[54] CAST TUBE-YOKE BRACKET ASSEMBLY

[75] Inventors: Dee Bear, Roanoke; Richard Cleveland, Garrett; Michael R. Fetcho; John T. Graft, both of Ft. Wayne; Thomas Redding, Huntington; Timothy Ward, Columbia, all of Ind.

[73] Assignee: Dana Corporation, Toledo, Ohio

[21] Appl. No.: 738,005

[22] Filed: Oct. 25, 1996

Related U.S. Application Data

[63] Continuation of Ser. No. 288,589, Aug. 10, 1994, abandoned.

[51] Int. Cl.⁶ .................................................... B60B 35/08
[52] U.S. Cl. ........................ 301/137; 301/124.1; 180/258
[58] Field of Search ........................... 301/124.1, 125, 301/127, 131, 132, 137; 180/276, 385, 252, 253, 258, 259

[56] References Cited

U.S. PATENT DOCUMENTS

| | | | |
|---|---|---|---|
| 1,439,787 | 12/1922 | Beechler | 301/137 |
| 1,734,709 | 11/1929 | Bayley | 180/258 |
| 1,841,418 | 1/1932 | Scott | 180/258 X |
| 2,075,563 | 3/1937 | Alden | 180/259 |
| 2,911,262 | 11/1959 | Franck | 301/124.1 |
| 3,801,124 | 4/1974 | Afanador et al. | |
| 4,168,086 | 9/1979 | Dick et al. | |
| 4,192,396 | 3/1980 | Austermann, Jr. et al. | 301/127 X |
| 4,271,922 | 6/1981 | Kishline | |
| 4,693,487 | 9/1987 | Cooper | |
| 4,807,939 | 2/1989 | Sasa | 180/259 X |
| 4,915,536 | 4/1990 | Bear et al. | |
| 5,303,985 | 4/1994 | Barnholdt et al. | 301/137 X |

FOREIGN PATENT DOCUMENTS 565992  12/1944  United Kingdom .................... 301/137

Primary Examiner—Russell D. Stormer
Attorney, Agent, or Firm—Oldham & Oldham Co., L.P.A.

[57] ABSTRACT

The invention is directed to a vehicle front-drive axle assembly having a front differential including a housing supporting left hand and right hand one-piece assemblies. Each of the left hand and right hand assemblies extend outwardly from the housing, and include an axle tube having a first end coupled to the housing and a second end having an integral yoke member. The one-piece assemblies further have integral bracket assemblies having outwardly extending mounting portions for mounting of vehicle suspension components and for securing the axle assembly to the vehicle. Each of the left hand and right hand one-piece assemblies are manufactured by suitable casting procedures, providing an assembly which has greater structural integrity than when multiple components are welded together, and which reduces cost and simplifies assembly into the vehicle.

17 Claims, 5 Drawing Sheets

CAST TUBE-YOKE BRACKET ASSEMBLY

This is a continuation of application Ser. No. 08/288,589 filed on Aug. 10, 1994 now abandoned.

BACKGROUND OF THE INVENTION

This invention relates generally to a front drive axle assembly including cast tube-yoke bracket assembly for a vehicle, and more particularly to a single cast assembly incorporating the yoke, brackets, and axle tube in a front driving axle for a vehicle.

In a front driving axle for a vehicle, a front differential receives drive power from a drive shaft driven by means of the vehicle engine and transmission. Extending outwardly from the differential are left hand and right hand axle tubes along with brackets for mounting to the vehicle suspension and frame, and associated yoke members which support a steering knuckle by means of a king pin or ball joints. The steering knuckle in turn is provided with an outwardly extending stub shaft for connection and support of front drive wheels for the vehicle. In general, the axle tube, yoke, and various bracket assemblies are supplied as individual elements which must be rigidly connected to one another in precise alignment and relative positions for proper operation of the vehicle. To properly secure the individual elements together in the axle assembly, special fixtures have been required to locate the various individual elements, and the elements are then welded together to provide rigid attachment of the components. Manufacturing of an axle assembly in this manner has therefore been relatively complex and expensive.

SUMMARY OF THE INVENTION

Based upon the foregoing, it is a main object of the invention to provide a single cast assembly incorporating the yoke, brackets, and axle tube of a front-driving axle. The single casting replaces the multiple wrought, stamped and forged components which must be welded together. The single casting reduces cost and allows the position of the relative interface locations for mounting of the axle assembly in the vehicle to be more precisely located.

The vehicle front-drive axle assembly of the invention comprises a front differential including a housing supporting left hand and right hand one-piece assemblies. Each of the left hand and right hand assemblies extend outwardly from the housing, and include an axle tube having a first end coupled to the housing and a second end having an integral yoke member. The one-piece assemblies further have integral bracket assemblies having outwardly extending mounting portions for mounting of vehicle suspension components and for securing the axle assembly to the vehicle. The one-piece assemblies provide improved accommodation of expected loads imposed upon the drive axle, with improved bending and torsional stiffness to reduce beaming of the one-piece components. Each of the left hand and right hand one-piece assemblies are manufactured by suitable casting procedures, with the casting utilizing a minimum number of cores and defining an assembly which has greater structural integrity than when multiple components are welded together.

BRIEF DESCRIPTION OF THE DRAWINGS

The objects and advantages of the invention will become apparent upon reading of the following detailed description in association with the accompanying drawings, wherein.

DETAILED DESCRIPTION OF THE INVENTION

Figure 1:
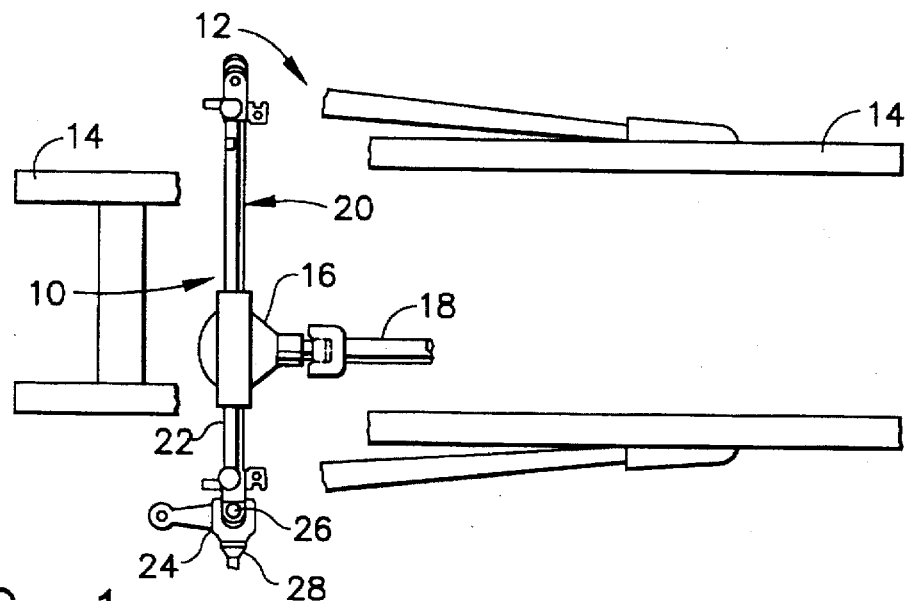
FIG. 1 is a partial cut-away top plan view of the front drive axle assembly as mounted in a vehicle.

Turning now to FIG. 1, there is shown a front axle assembly 10 for supporting conventional steerable wheels (not shown). The front axle assembly 10 interconnects with the vehicle suspension system 12 and frame 14 forming part of the vehicle chassis. The axle assembly 10 includes a differential housing 16 coupled to a front drive shaft 18. Extending outwardly from the differential housing 16 are integral axle tube and yoke assemblies 20 and 22, each of which include integral axle tubes, bracket assemblies, and yoke members as will be hereinafter described in more detail. Each yoke member supports a steering knuckle 24 (one of which is shown) by means of a king pin or ball joints 26. The steering knuckle 24 is provided with an outwardly extending stub shaft 28 for connection to the vehicle wheel. The connection of the axle assembly 10 to the vehicle suspension system 12 and frame 14 requires a plurality of bracket assemblies which are precisely positioned to properly secure these components together. The integral axle tube and yoke assemblies 20 and 22 are preferably formed of a ductile iron material to accommodate the required elongation characteristics necessary for forces applied to the axle assembly. The material enables elongation sufficient to accommodate expected stress to prevent failures.

Prior to the present invention, the axle tube, bracket assemblies, and yoke members associated with the axle assembly 10 were comprised of separate stamped, forged, and wrought components which were welded together to provide rigid attachment at particular locations. The cost associated with fabricating each of the multiple components used previously in the front driving axle assembly 10 increased the cost of the assembly and required time consuming and precise welding procedures to properly position the various components relative to one another. In the present invention, these multiple components have been combined into a single casting, with the entire assembly preferably cast by a green sand casting process or a lost foam process. Other conventional casting processes may also be used if desired. The casting has been provided using a minimum number of cores to further reduce cost and simplify fabrication. The single integral casting greatly improves the consistency and accuracy of vehicle interface mounting points between the axle assembly 10, the vehicle suspension system 12, and the vehicle frame 14.

Figure 2:
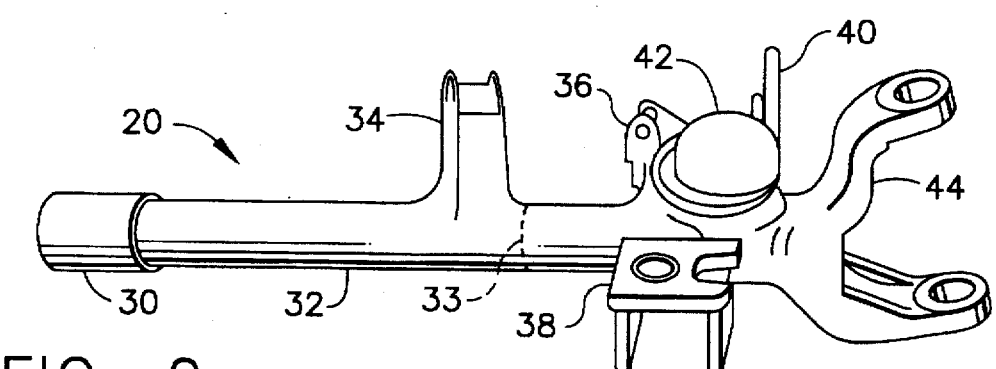
FIG. 2 is a perspective view of assembly of the front-drive axle assembly in accordance with the invention.

One of the integral axle tube, bracket assemblies, and yoke members 20 and 22, forming a part of the axle assembly 10 is shown in FIG. 2. In FIG. 2, the right hand axle tube/yoke assembly 20 is shown, with the left hand assembly 22 being of similar configuration, but being shorter than the corresponding right hand assembly 20. As seen in FIG. 1, the differential housing 16 of the axle assembly 10 may be displaced slightly off-center to accommodate other vehicle components. Different length axle tube/yoke assemblies 20 and 22 accommodate the off-center positioning of the differential housing 16. As will be described in more detail hereinafter, the assemblies 20 and 22 each include a hub portion 30 for securing to the differential housing 16, and an axle tube 32 having a predetermined length. Integral with the axle tube 32 are a plurality of bracket assemblies generally indicated at 34, 36, 38, and 40. Also formed integrally with the axle tube 32 is a spring seat assembly 42 as well as an integral king pin yoke member 44 for supporting a steering knuckle as previously mentioned. As shown in FIG. 2, the axle tube/yoke assembly may have an axle tube of predetermined length, but alternatively a portion of the axle tube may be provided as a separate component coupled to the integral axle tube/yoke assembly (such as shown by the broken line at 33) to allow both right and left hand side assemblies 20 and 22 to be constructed similarly. Further, it should be understood that depending upon the particular vehicle in which the invention is to be used, the assemblies 20 and 22 may be of similar length, or one or the other may be of different dimension.

Figure 3:
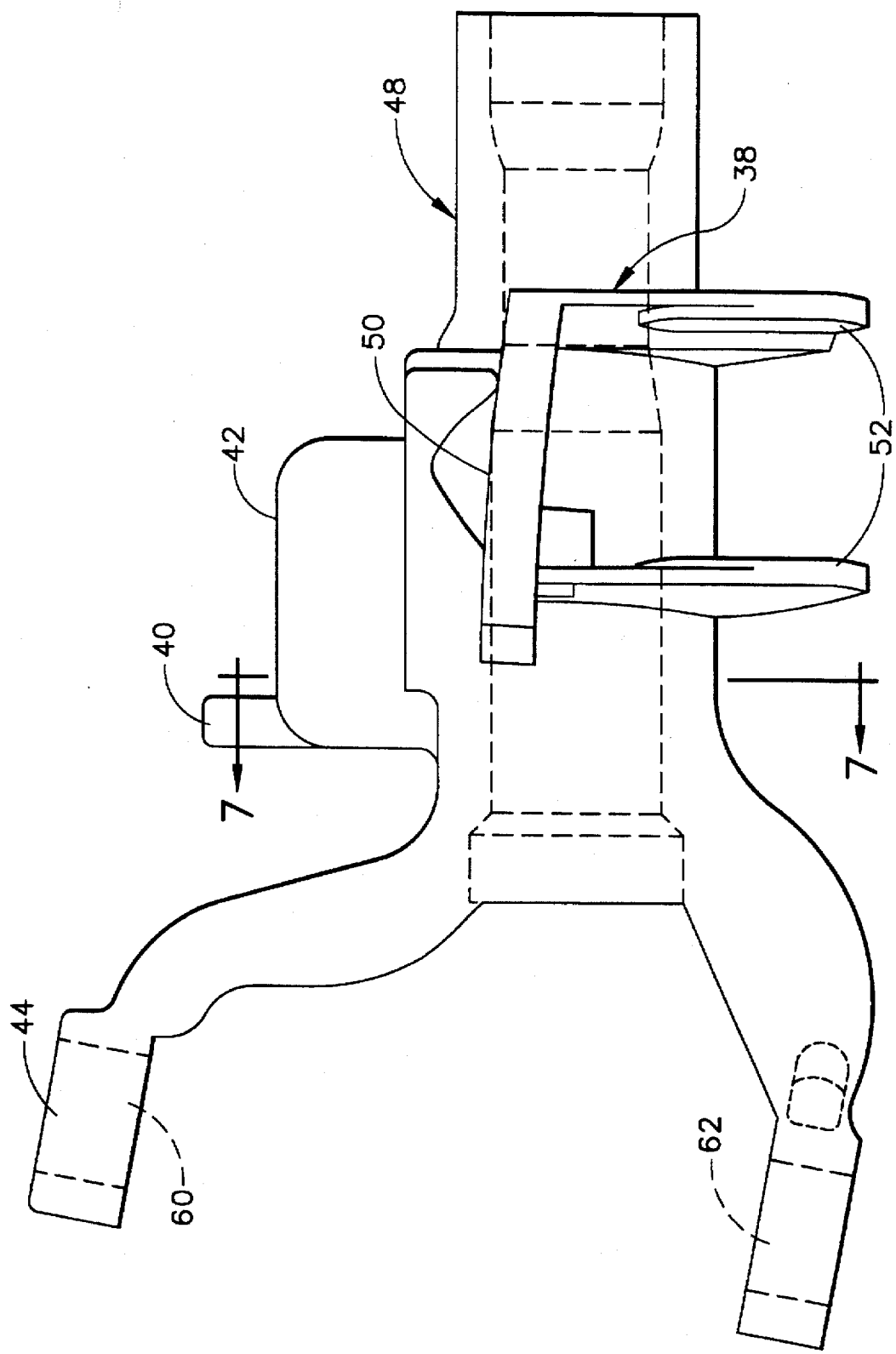
FIG. 3 is a front elevational view of the left hand one-piece assembly associated with the axle assembly of the invention.
Figure 4:
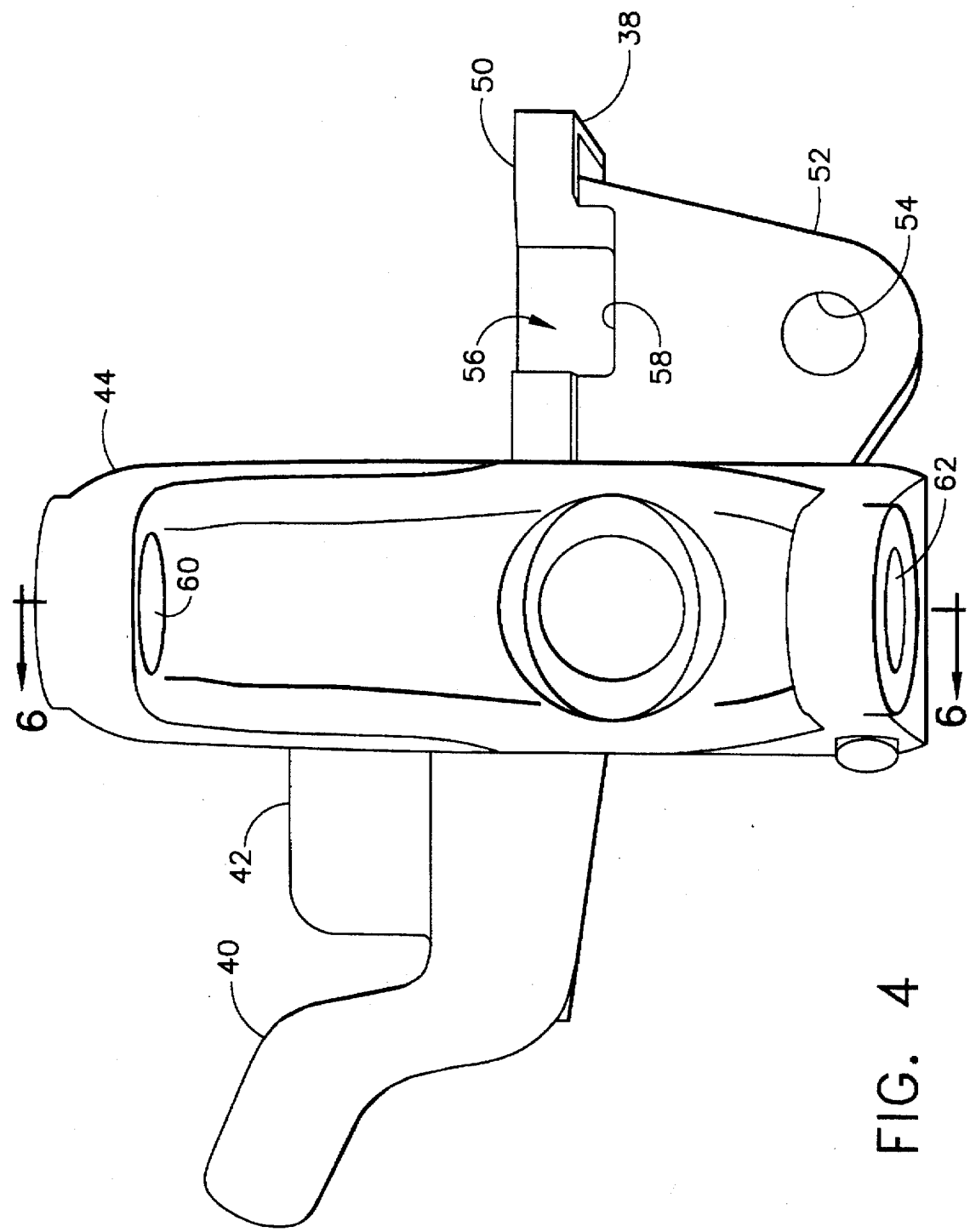
FIG. 4 is an end elevational view of the one-piece assembly shown in FIG. 3.
Figure 5:
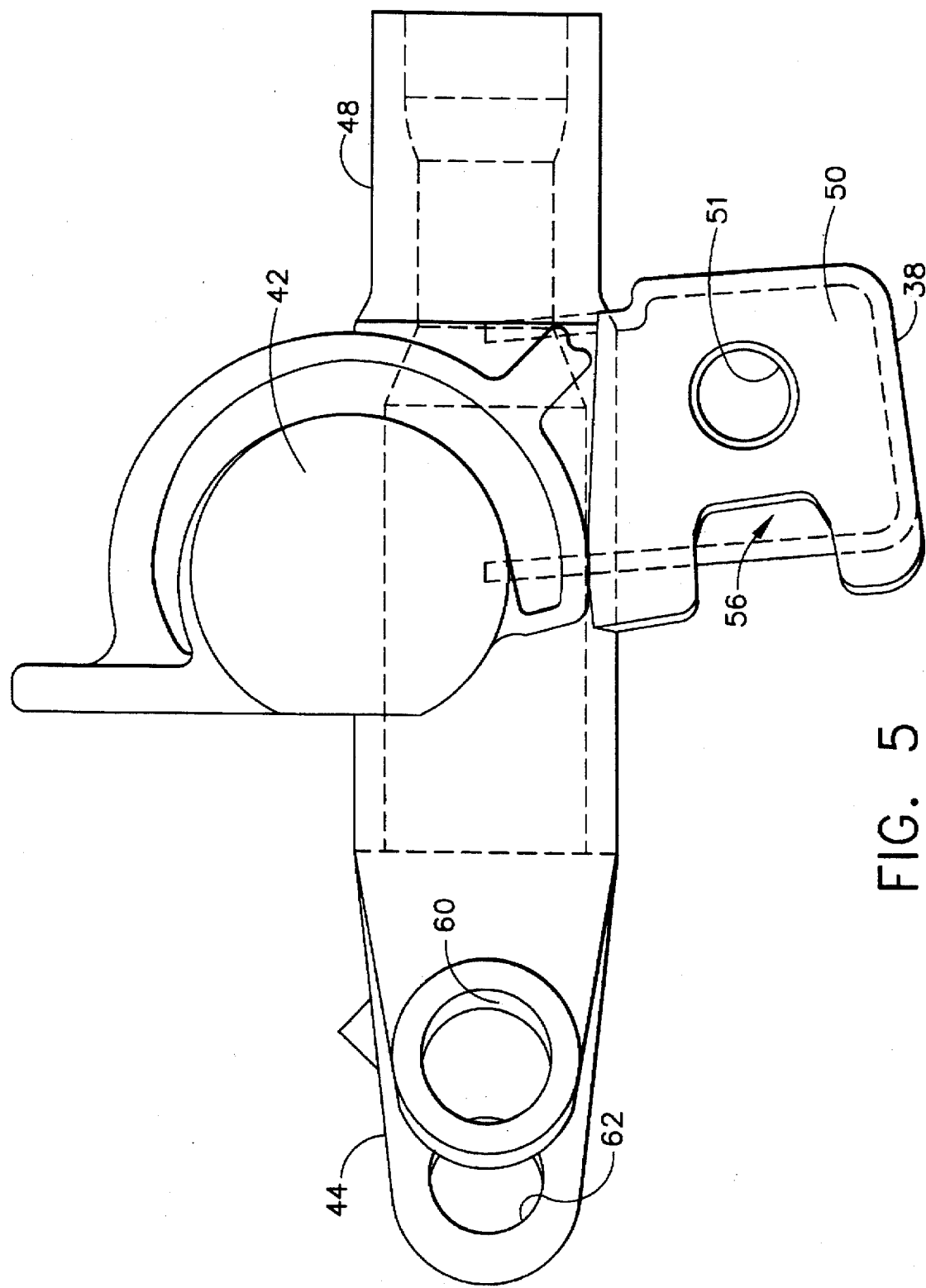
FIG. 5 is a top elevational view of the one-piece assembly shown in FIG. 3.

The integral axle tube/yoke assembly of the invention is shown in more detail in FIGS. 3–5. In these figures, the left hand assembly 22 is shown, with the right hand assembly being substantially a mirror image of this configuration, and further including a bracket assembly 34 as shown in FIG. 2. The bracket assembly 34 forming a part of the right hand assembly 20 is a control arm bracket for mounting of a control arm associated with the vehicle suspension system, and necessary only on the right hand side of the axle assembly 10. Each of the assemblies 20 and 22 generally comprise an elongated tubular construction having the various other bracket assemblies integrally cast therewith along with yoke assembly 44. Each of the integral axle tube/yoke assemblies 20 and 22 include a spring seat assembly 42 providing support for a portion of the vehicle suspension system. A control arm bracket extends outward from the tubular portion of the assembly, with an upper member 50 having a weight saving hole 51, and inwardly extending segments 52 having mounting holes 54 formed therein. A supporting notch 56 having a bottom supporting surface 58 is formed in association with top member 50, allowing positive seating of suspension components with respect to the bracket assembly 38. The control arm bracket assembly is precisely positioned in the one-piece member for simplifying subsequent assembly with a control arm of the vehicle.

Also provided in integral relationship with the unitary assembly is a stabilizer bar bracket assembly 40 extending outwardly from the tubular member as shown more distinctly in FIG. 4. In addition to these bracket assemblies, the right hand axle tube/yoke assembly as illustrated in FIG. 2 includes a further track bar bracket assembly 36 extending at a predetermined angle from the spring seat assembly 42 of the integral tubular member 48. The angle at which the stabilizer bracket extends depends upon the particular vehicle. The brackets are precisely positioned such that upon assembly of the integral axle tube/yoke assembly with the front differential of the vehicle, each of the bracket assemblies as well as the spring seat assembly will be precisely positioned relative to other vehicle components for proper operation of the front axle assembly.

Integrally in association with the axle tube and formed at its outer end relative to the differential case in which the assemblies are mounted, is the yoke assembly 44 adapted to support a steering knuckle as previously described. The yoke member 44 includes precisely positioned mounting holes 60 and 62 which cooperate for mounting of the steering knuckle by means of ball joints or a king pin (not shown).

The tubular member 48 is constructed to provide predetermined varying wall thicknesses as well as varying cross-sectional configuration along its length to provide enhanced structural integrity in association with the vehicle frame and suspension system. As the ground engaging wheels supported by the front axle assembly traverse a road surface, deviations from a normal flat surface will cause the axle assembly to move relative to the vehicle frame, which is controlled by means of the connection to the frame and suspension system. The axle assembly by its connection to the frame is able to swing in an arc relative to the frame, as well as in the vertical direction in association with the suspension system. The connection to the vehicle frame and suspension system prevents unwanted motion of the axle assembly, and forces will be applied on the axle assembly which will vary based upon a number of factors such as the vehicle size and load carrying capacity. In the embodiment shown in the figures for example, the axle assembly is designed for a specified load of 3,300 pounds but the construction may be modified for other specified loads as desired.

Stress loads applied to the axle assembly must therefore be accommodated by the integral axle tube/yoke assemblies, with the design of tubular member 48 adapted to the particular characteristics of the vehicle. The connection of the axle assembly by means of the various bracket assemblies 34, 36, 38, and 40 requires that the brackets and associated axle tube be capable of withstanding expected stress loads which may be applied to the assemblies. Similarly, the yoke must support the steering knuckle in a manner to accommodate loads imposed thereon. The integral cast construction of the axle tube/yoke and integral bracket assemblies allow the assembly to be tailored for the loads expected in a particular application, with the wall thicknesses and cross-sectional configuration of the tubular member 48 being modified along the length thereof to enhance the structural integrity of the assembly at these locations.

Figure 7:
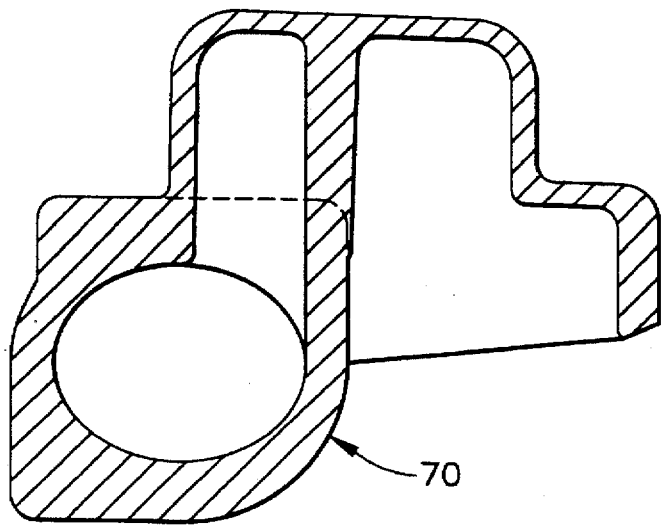
FIG. 7 is a cross-section taken along line 7—7 of FIG. 3.
Figure 6:
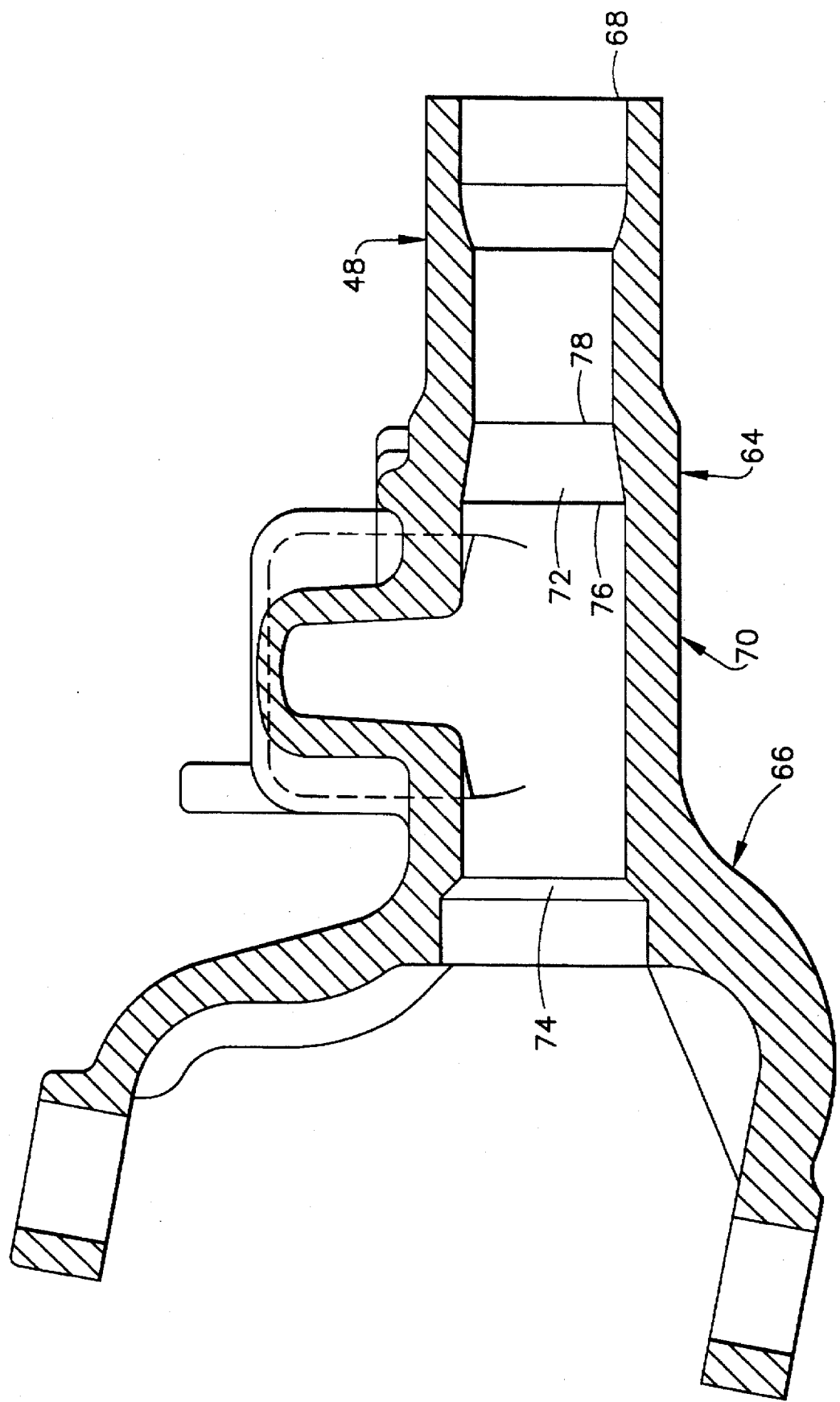
FIG. 6 is a cross-sectional view taken along line 6—6 of FIG. 4.

As shown in FIGS. 6 and 7, the cross-sectional illustrations of the integral assembly indicate varying wall thicknesses as well as varying cross-sectional configurations at particular locations in the assembly. In FIG. 6, variations in wall thickness along the length of tubular member 48 are shown, with increased wall thicknesses being provided at various locations, such as shown for example at 64 and 66. The particular wall thicknesses along the length of tubular member 48 may again vary depending upon the particular design of the vehicle, with the casting process allowing the integral axle tube/yoke assembly to be tailored for a particular application. The casting process also allows variation in the cross-sectional configuration of the tubular member 48 along the length thereof. In this example, the cross-section of tubular member 48 is circular at its first end 68 for connection to the differential case of the axle assembly. As shown in FIG. 7, along a portion of the length of tubular member 48 generally designated 70, the cross-section thereof is varied to be elliptical rather than circular. The transition from circular to elliptical occurs in region 72, with the elliptical being varied at region 74 to again be circular adjacent yoke 44 for mounting of steering knuckle in association therewith. The elliptical cross-section provides better structural integrity over this region where the plurality of bracket assemblies are positioned. The ability to form an elliptical cross-section by casting of the entire assembly allows more material to be positioned at the locations of highest load stress, enhancing the capability to withstand expected loads at these locations. The integral cast member provides precise positioning of each bracket assembly and allows additional seats or bosses to be formed for mounting or connection to components associated with the axle and suspension system, or for attaching brake hoses, speedometer cables, or any other equipment necessary for operation of the axle assembly or associated wheel assemblies.

In the preferred embodiment, the construction of the one-piece assemblies also allows for more uniform distribution of loads over load bearing portions of the assemblies, to accommodate beaming or elastic deformation under dynamic conditions. As in the present case, the right and left hand one-piece assemblies may be of unequal length, causing resonant bending or beaming frequencies under certain operating conditions. The characteristics over the main beaming section of the one-piece assemblies are particularly important with respect to vertical beaming characteristics, with the present invention allowing for optimization of these characteristics for a particular drive axle construction. In FIG. 6, the main beaming section of the one-piece assembly is the portion of tubular section 48 extending from region 72 to region 74. In this portion, the tubular member 48 has a varied inner cross-sectional configuration as previously described. Over the main beaming section of the one-piece assembly, the elliptical cross-sectional configuration shown in the preferred embodiment allows placement of the material more efficiently for accommodating vertical beaming stresses. In the preferred embodiment, the ratio of the moment of inertia about the axis of the assembly for vertical and horizontal beaming are shown in the following table over the transition zone 72 as shown in FIG. 6 for a particular example of the invention. This data is based upon a tubular representation of the one-piece assembly having a simple circular outer surface with section modulii calculated at the ends of the transition zone 72, and at equidistant intervals through the transition zone.

TABLE I

| Section | Area (MM*2) | I (MM4) Vertical Beaming | I (MM4) Horizontal Beaming | I (Vert.)/ I (Hort.) |
| --- | --- | --- | --- | --- |
| Beaming | 2.7185E3 | 1.6705E6 | 1.4830E6 | 1.1264 |
| Transition (1) | 2.6794E3 | 1.6385E6 | 1.4938E6 | 1.0969 |
| Transition (2) | 2.6428E3 | 1.6051E6 | 1.5063E6 | 1.0656 |
| Transition (3) | 2.6098E3 | 1.5704E6 | 1.5198E6 | 1.0333 |
| Press-Up | 2.5802E3 | 1.5344E6 | 1.5344E6 | 1.0000 |

The foregoing data for a particular example of the invention shows the characteristics of the main beaming section having an elliptical cross-section at 76 to better accommodate vertical beaming stresses, to the press-up portion of the one-piece assembly at 78 having a circular cross section. As shown in this example, the ratio of the moments of inertia for vertical and horizontal beaming is 1.1264 at the main beaming section. In the preferred embodiment, the ability to provide a varied cross sectional configuration in the integrally cast unit optimizes vertical beaming characteristics of the one-piece assembly. In the invention, the ratio of the moments of inertia for vertical and horizontal beaming are in the range between 0.75 and 4.0, with stiffness characteristics of a particular one-piece assembly depending upon a particular vehicle and attachment of the drive axle thereto. As also shown in this example, the section modulii given in the table over the transition region of the one-piece assembly show a smooth transition from a circular cross section to a cross section having an increased ratio of moment of inertia for vertical versus horizontal beaming as indicated. It also should be recognized that although an elliptical cross section has been shown to provide increased bending and torsional stiffness, a transition to an alternate cross sectional configuration is contemplated in the invention, with the relationship between vertical and horizontal beaming moments of inertia as described above. As the drive axle is comprised of both left hand and right hand one-piece assemblies, depending upon the particular vehicle configuration, the one-piece assemblies will be designed to provide desired torsional stiffness by varying the cross sectional configuration of the assembly along its length in a predetermined manner, such as shown in the example given above.

From the foregoing, it should be recognized that the invention provides a front drive axle assembly wherein left and right hand one-piece assemblies including an axle tube for connection to a front differential, and a plurality of bracket assemblies extending outwardly from the axle tube as well as a yoke member for mounting of a steering knuckle. The one-piece assemblies are preferably cast, and result in reducing cost and inventory of separate components. Casting eliminates assembly and forging tooling as well as the weld assembly of the various components as previously provided. The integral cast assemblies provide better structural integrity with all attachment holes and king pin alignment established very precisely. The invention will also eliminate weld joints to provide improved corrosion resistance.

It should be recognized that various changes or modifications may be made to the above described apparatus without departing from the scope of the invention as defined in the following claims.

What is claimed is:

1. A vehicle front drive axle assembly, comprising:
    a front differential including a housing supporting left hand and right hand assemblies;
    each of said left hand and right hand assemblies including an axle tube coupled to said housing, with at least a portion of said axle tube having an integral yoke member for supporting a steering knuckle;
    each of said axle tubes having at least one integral bracket assembly having mounting portions extending radially from said axle tube for mounting of vehicle suspension means and for securing said axle assembly to said vehicle;
    each of said axle tubes having varying cross-sections along their length, with said cross-sections being varied in a predetermined manner along the length of said axle tube to accommodate expected stress loads thereon; and
    said axle tube varies from a circular cross-section to an elliptical cross-section, providing additional material at predetermined positions along the length of said axle tube to accommodate expected stress loads thereon.

2. The front drive axle assembly of claim 1, wherein said integral yoke member includes mounting holes for mounting of said steering knuckle by means of a king pin or ball joints positioned through said mounting holes.

3. The front drive axle assembly of claim 1, wherein said axle tube of said assemblies is of predetermined length and is coupled to a further axle tube portion which is coupled to said housing and a plurality of bracket assemblies are provided integrally along the length of said axle tube.

4. The front drive axle assembly of claim 1, wherein said axle tube of each of said assemblies has varying wall thicknesses along its length, with predetermined wall thicknesses designed to withstand stress loads expected along the length of said axle tubes.

5. The front drive axle assembly of claim 1, wherein said left hand and right hand assemblies are formed from a ductile iron material.

6. The front drive axle assembly of claim 1, wherein said at least one integral bracket assembly is a control arm bracket including a supporting notch integrally formed therein to positively seat suspension components of a vehicle therein and for mounting of a control arm associated with the vehicle suspension system.

7. The front drive axle assembly of claim 1, wherein said assemblies include a spring seat integrally cast therewith for supporting vehicle suspension system components.

8. The front drive axle assembly of claim 1, wherein a plurality of integral bracket assemblies are provided, and include at least a control arm bracket, a stabilizer bar bracket, a track bar bracket and a spring seat and said track bar bracket extends outwardly of said spring seat at a predetermined angle.

9. The front drive axle assembly of claim 1, wherein each of said assemblies has at least a portion provided with a cross section characterized in that the ratio of the moment of inertia for vertical beaming to the moment of inertia for horizontal beaming is in the range between 0.75 and 4.0.

10. An integral axle tube and yoke assembly for use in a vehicle axle assembly, comprising:

a one-piece assembly including an axle tube portion having first and second ends, with said second end having an integral yoke for supporting a steering knuckle of a vehicle;

said axle tube portion having at least one integral bracket assembly having mounting portions extending outwardly from said axle portion;

said axle tube portion having a varying cross-sectional configuration along its length, with said cross-sectional configuration being varied in a predetermined manner to accommodate expected stress loads thereon; and said axle portion varies from a circular cross-section to an elliptical cross-section, providing additional material at predetermined positions along the length of said axle portion to accommodate expected stress loads thereon.

11. The integral axle tube and yoke assembly of claim 10, wherein said integral yoke member includes mounting holes for mounting of said steering knuckle by means of a king pin or ball joints positioned through said mounting holes.

12. The integral axle tube and yoke assembly of claim 10, wherein said axle tube of said assemblies is of predetermined length and is coupled to a further axle tube portion which is coupled to said housing and a plurality of bracket assemblies are provided integrally along the length of said axle tube.

13. The integral axle tube and yoke assembly of claim 10, wherein said axle tube of each of said assemblies has varying wall thicknesses along its length, with predetermined wall thicknesses designed to withstand stress loads expected along the length of said axle tubes.

14. The integral axle tube and yoke assembly of claim 10, wherein said left hand and right hand assemblies are formed from a ductile iron material.

15. The integral axle tube and yoke assembly of claim 10, wherein said at least one integral bracket assembly is a control arm bracket including a supporting notch integrally formed therein to positively seat suspension components of a vehicle therein and for mounting of a control arm associated with the vehicle suspension system.

16. The integral axle tube and yoke assembly of claim 10, wherein said assemblies include a spring seat integrally cast therewith for supporting vehicle suspension system components.

17. The integral axle tube and yoke assembly of claim 10, wherein a plurality of integral bracket assemblies are provided, and include at least a control arm bracket, a stabilizer bar bracket, a track bar bracket and a spring seat and said track bar bracket extends outwardly of said spring seat at a predetermined angle.

\* \* \* \* \*